United States Patent Office 3,418,624
Patented Dec. 24, 1968

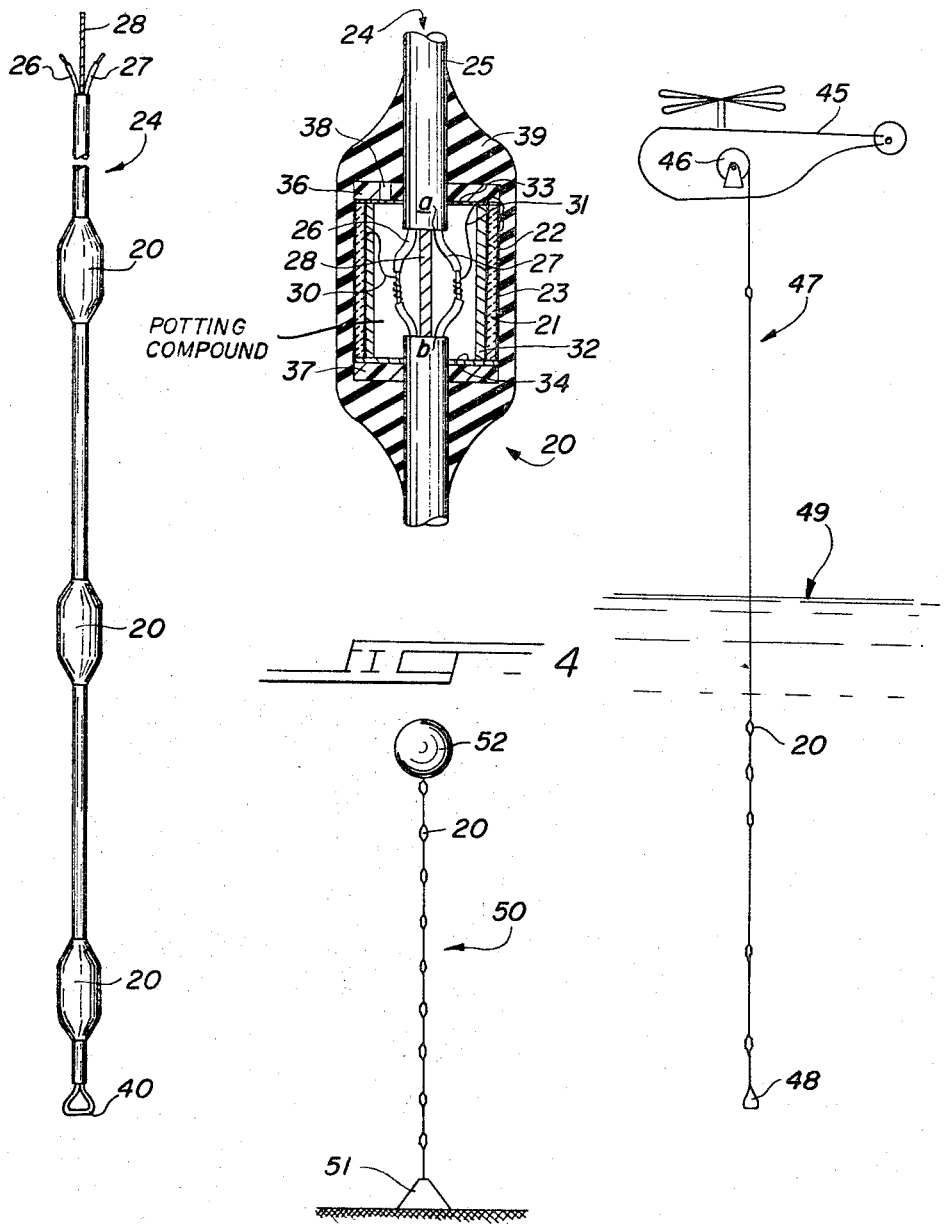

3,418,624
COAXIALLY MOUNTED LINE HYDROPHONE
Frank Massa, Cohasset, Mass., assignor to Massa Division, Dynamics Corporation of America, Hingham, Mass.
Filed Mar. 27, 1967, Ser. No. 626,149
4 Claims. (Cl. 340—9)

ABSTRACT OF THE DISCLOSURE

A plurality of hydrophone elements are molded directly to a cable which passes coaxially through them. The elements are distributed as "beads" along the length of the cable so that they may be lowered under the surface of the water. In such a position, they are used as transducers for under water sound transmission or detection. Among other things the coaxial construction eliminates shadow zones and prevents entanglement of the hydrophone elements.

---

This invention relates to line hydrophones for use in directional underwater sound receiving and transmitting apparatus and more particularly to rugged coaxially mounted hydrophone structures especially—although not exclusively—well suited for use in deep water.

A "line hydrophone" assembly generally comprises a length of cable having a suitable number of hydrophone transducer elements attached thereto. Very often, these hydrophones are spaced along a length of the cable, near the end thereof. Each hydrophone element is a device for converting any sound waves appearing in the water into corresponding electrical signals, which may be processed in any known manner; or, conversely, the hydrophone element may convert electrical signals into corresponding sound waves for transmission through the water. This use of such a line array of hydrophone elements produces a vertical beam that discriminates against surface water noise and thus improves the listening range of the hydrophone.

Those skilled in the art already know of many applications for line hydrophone assemblies. For example, they may be deployed from a hovering patrol helicopter which is "listening" for submerged submarines. Or they may be deployed to generate sound energy which is transmitted from the hydrophone elements to provide underwater telephony.

Generally, the line hydrophone assembly is wound on a motor operated reel. This way, it is a very simple matter to lower the line into the water or to raise it out of the water by operating the motor to wind or unwind the reel. A long line permits the hydrophone elements to be lowered into very deep water where it is easiest to make a long range sonic contact. Thus, for example, an operator in a hovering helicopter may quickly and easily deploy an extremely long length of line, pull it in, and then redeploy it in a new location.

Heretofore, the hydrophone elements have been attached to short lengths of wire which are spliced to the cable that is raised and lowered. This array of dangling hydrophones caused many problems. For example, the splice, wires, and cable cast "shadows" in the sonic energy falling on the hydrophones. Also, the dangling hydrophone elements tended to become entangled when the cable was reeled in and out. Thus, as a practical matter both the usefulness and the duration of the hydrophone usage suffered.

Accordingly, an object of this invention is to provide new and improved line hydrophones. More particularly, an object is to provide line hydrophones having a full 360° sound field, free of shadow zones. Here, an object is to provide supporting structures which offer minimum obstruction in the sound field adjacent the hydrophone elements.

Another object is to provide a hydrophone structure having a number of extremely sensitive transducer elements spaced along a length of cable.

A further object is to provide cable which may be deployed at very high speeds with virtually no danger of damage to or entanglement of the hydrophone elements. More particularly, an object is to provide hydrophone elements coaxially mounted on the cable itself so that the elements and cable form an integrated unit. In this connection, an object is to mold the hydrophone elements to the cable with a covering of watertight, sound transmitting, elastomer material.

Still another object is to provide a rugged, multi-element, line hydrophone from cylindrical shells assembled as "beads" spaced along and molded into a completely waterproof cable assembly.

For a better understanding of how the invention accomplishes these and other objects, reference may be made to the attached drawings, in which:

FIG. 1 is a cross sectional view of a single hydrophone element constructed according to the teaching of this invention;

FIG. 2 is a perspective view of a line hydrophone assembly wherein a number of the elements shown in FIG. 1 are assembled as "beads" spaced along a cable;

FIG. 3 illustrates an application of the invention to an underwater detection system; and FIG. 4 illustrates a second application of the invention to a hydrophone system moored to the bottom of the ocean.

This election to show an exemplary hydrophone construction and several applications for a complete line assembly should not be taken as a restriction upon the invention. Quite the contrary, the novel features of my invention are set forth in the appended claims which are to be construed broadly enough to cover all equivalents falling within the true scope and spirit of my invention.

In my preferred embodiment the hydrophone element 20 includes a cylindrical transducer element 21. While element 21 may be made from a number of different materials, I prefer to use a cylindrical shell of polarized ceramic material such as barium titanate or lead zirconate titanate. The inner and outer cylindrical surfaces of this shell are covered with metallic electrode surfaces 22, 23, respectively.

The ceramic shell (with its electrodes) is co-axially mounted on a cable 24 comprising an outer, waterproof jacket 25, a pair of electrically conductive insulated wires 26, 27, and a strain cable 28. The waterproof jacket 25 is removed inside the ceramic shell (as indicated at a, b,) to expose the electrical wires 26, 27. These wires are stripped of their insulation to permit the completion of electrical connections between the inner and outer electrodes 22, 23 via leads 30, 31, respectively. Upon reflection, it should be obvious that the wires 26, 27 and leads 30, 31 complete the electrical circuit required to supply the line hydrophone, and the strain cable 28 supports the weight of the entire assembly.

Means are provided for making the hydrophone elements rugged and waterproof. In greater detail, a thin layer of a low acoustic impedance, pressure release material 32 is bonded to line the entire inner wall of the ceramic cylinder 21. Then, disks 33, 34 of the same material are fitted over the ends of the cylinder. While any suitable material may be used to provide this pressure release lining, I prefer to use a mixture of cork and rubber of the type sold under the trademark "Corprene." Any suitable cement may be used to bond this material to the ceramic.

After the "Corprene" disks 33 and 34 are in place, end caps 36, 37 are cemented by any suitable adhesive to the two ends of the ceramic cylinder 21. I prefer to use either Bakelite or metal for the end plates; however, I do not consider this critical. One of the end caps (here 36) contains a hole 38 through which a potting compound (such as epoxy) is poured. This compound should completely fill the entire cylindrical space inside the transducer. This potting prevents the leads 30, 31 from vibrating and locks the cylinder in place.

Finally, a sound transparent jacket or layer 39 of material, such as rubber, is molded over the outer surface of the ceramic cylinder 21. To facilitate deployment of the line hydrophone without danger of entanglement and to enhance appearance, the molded jacket should have a smooth and contoured shape tapering from each end of the relatively large diameter of the cylinder 21 to the relatively small diameter of the cable 24. The bond between the cable jacket 25 and transducer jacket 39 should, of course, be completely waterproof when the hydrophone is lowered to the deepest depth at which it may be used.

As shown in FIG. 2, a number of the hydrophone elements 20 may be assembled as "beads" spaced along the cable 24. The cable 24 is completely flexible, and the hydrophone elements are relatively short so that they do not seriously interfere with the flexibility. The insulated electrical wires 26, 27 and the strain cable 28 are shown emerging from the top of the cable 24. They run through the entire length of the assembly. The strain cable emerges at the bottom where it is formed into a loop 40. By inspection, it should be obvious that the cable 24 passes through the center line of the hydrophone elements 20—which is why they are described herein as being "coaxially mounted."

The strain cable 28 acts as a continuous tension member for supporting the full length of the entire cable and hydrophone elements. The upper end 28 may be attached to anything lifting the cable, and a weight or anchor may be attached to the loop 40. This way the assembly is held tautly in a vertical position.

The entire assembly, shown in FIG. 2 and described above is herein called a "line hydrophone." This assembly results in a very rugged structure which may be wound onto drums as the cable is deployed and thereafter reeled-in. Since the hydrophones are integral with the cable, they may be reeled without any danger of damage. Also, there are no loose and dangling parts which may become entangled or move about in the water to cause noise. Moreover, the cables, splices, and wires are inside the transducer so that they do not cast shadows in the sound waves falling on the transducers.

Those who are skilled in the art may find many occasions to use the inventive line hydrophone. However, so that the disclosure may be complete, it may be well to here mention a few such uses. Thus, FIG. 3 shows a hovering helicopter 45 which has a motor-driven reel 46 therein. The helicopter 45 is here shown as having lowered the line hydrophone 47 so that its weighted end 48 hangs deep under the surface 49 of the ocean. The spaced array of hydrophone elements 20 are near the lower weighted end of the cable. With the line hydrophone thus deployed, the helicopter can accomplish long range underwater sonic detection.

Because the weighted end 48 acts as a sinker to keep the line vertical and taut, and because of the transducer construction, there is maximum sensitivity in the horizontal plane extending outwardly in all directions at right angles to the axis of the line. There is a minimum sensitivity along the vertical axis. Thus, the system discriminates against surface water and helicopter noise.

The application in FIG. 4 shows the line hydrophone 50 as anchored to the bottom of the ocean at 51. A buoy 52, having positive buoyancy creates a sufficient vertical tension to tautly extend the entire cable upwardly.

In each of these, and other applications, the electrical wires 26, 27 may be extended in any suitable manner to associated electronic equipment (not shown). That equipment could include sonar or other sonic location devices, underwater telephony devices, pinging devices or the like. Moreover, multiple line arrays could be deployed for obtaining horizontal beams. Therefore, the appended claims are intended to cover both the inventive line hydrophone and all modifications falling within the true spirit of the invention regardless of the particular application thereof.

I claim:
1. A line hydrophone electroacoustic transducer system comprising a flexible cable containing at least a single pair of electrical conductors and a strain cord for supporting the weight of the line hydrophone, a plurality of transducer elements spaced along at least a portion of said flexible cable, each of said transducer elements comprising a cylindrical shell of polarized piezoelectric ceramic material completely surrounding said flexible cable, a layer of low acoustic impedance pressure relief material lining the inside of said cylinder, electrical connection means inside said cylinder for connecting said ceramic transducer to said pair of electrical conductors, a potting compound completely filling the space inside the cylindrical shell for supporting said connections, mechanically reinforcing said shell, and locking said connection means in place, rigid end caps closing said ceramic cylinder, said end caps having a central opening for receiving said flexible cable and coaxially mounting said transducers on said cable, and a layer of said pressure relief material interposed between said end caps and said potting compound whereby the transducer elements will respond primarily to the radial mode of the sound field.

2. The line hydrophone of claim 1 wherein said flexible cable has a waterproof covering and a flexible waterproof sound conducting jacket completely surrounding and enclosing said transducer elements in integrally bonded contact and bonded to said cable covering.

3. The assembly of claim 1 wherein said cable comprises a plurality of insulated electrical conductors for carrying electrical signals to and from said transducer elements.

4. The assembly of claim 3 and means attached to one end of said strain cord for pulling said one end of said line downwardly, and means attached to the other end of said strain cord for pulling said line upwardly, thereby giving said line a taut vertical orientation.

References Cited

UNITED STATES PATENTS

| | | | |
|---|---|---|---|
| 2,762,032 | 9/1956 | Vogel | 340—10 |
| 2,788,513 | 4/1957 | Howes. | |
| 2,837,731 | 6/1958 | Harris. | |
| 3,139,603 | 6/1964 | Church et al. | 340—10 |
| 3,277,436 | 10/1966 | Fitzgerald et al. | 340—10 |
| 3,286,227 | 11/1966 | Aldrich | 340—10 X |

RICHARD A. FARLEY, *Primary Examiner.*

R. L. RIBANDO, *Assistant Examiner.*

U.S. Cl. X.R.

340—10